(12) United States Patent
Koppes et al.

(10) Patent No.: US 9,033,137 B2
(45) Date of Patent: May 19, 2015

(54) CONVEYOR BELT HAVING OPPOSING ENDS TO BE CONNECTED FOR ENDLESSING THE CONVEYOR BELT

(71) Applicant: Ammeraal Beltech Holding B.V., Alkmaar (NL)

(72) Inventors: Petrus Cornelis Antonius Koppes, Alkmaar (NL); Fabio Martorano, Alkmaar (NL); Sergio Tremaglia, Alkmaar (NL)

(73) Assignee: AMMERAAL BELTECH HOLDING B.V., Alkmaar (NL)

( * ) Notice: Subject to any disclaimer, the term of this patent is extended or adjusted under 35 U.S.C. 154(b) by 0 days.

(21) Appl. No.: 14/309,944

(22) Filed: Jun. 20, 2014

(65) Prior Publication Data
US 2015/0001048 A1  Jan. 1, 2015

(30) Foreign Application Priority Data
Jun. 26, 2013  (NL) ...................................... 2011044

(51) Int. Cl.
*B65G 15/32* (2006.01)
*F16G 3/04* (2006.01)
*F16G 3/10* (2006.01)
*F16G 3/02* (2006.01)

(52) U.S. Cl.
CPC *B65G 15/32* (2013.01); *F16G 3/10* (2013.01); *F16G 3/04* (2013.01); *F16G 3/02* (2013.01)

(58) Field of Classification Search
CPC ............. B65G 13/30; F16G 3/02; F16G 3/04; F16G 3/10

USPC .......................................................... 198/844.2
See application file for complete search history.

(56) References Cited

U.S. PATENT DOCUMENTS

| | | | | |
|---|---|---|---|---|
| 1,659,883 A | * | 2/1928 | Lorentz | 24/33 C |
| 2,893,007 A | * | 7/1959 | De Windt | 29/428 |
| 4,035,872 A | | 7/1977 | MacBean | |
| 4,344,209 A | * | 8/1982 | Harwood | 24/31 R |
| 5,048,675 A | * | 9/1991 | Nadalutti | 198/844.2 |
| 5,724,706 A | | 3/1998 | Jakob | |
| 5,951,441 A | * | 9/1999 | Dalebout et al. | 482/54 |
| 6,321,903 B1 | * | 11/2001 | Shaffer | 198/844.2 |

(Continued)

FOREIGN PATENT DOCUMENTS

| | | |
|---|---|---|
| EP | 1719932 | 11/2006 |
| WO | 96/16279 | 5/1996 |

OTHER PUBLICATIONS

Search Report and Written Opinion for Application No. NL2011044, dated Mar. 12, 2014 (8 pages).

*Primary Examiner* — Mark A Deuble
(74) *Attorney, Agent, or Firm* — Michael Best & Friedrich LLP

(57) ABSTRACT

A conveyor belt having opposing ends to be connected for endlessing the conveyor belt. The belt includes a belt member, and two planar connector parts provided one at each said end of the belt. Each connector part has, at an edge of the connector part, an edge coil extending over the width of the belt. The belt is configured to be endlessed by bringing the edge coils of the first and second end into a sideways engagement to obtain an overlapping coil area and by inserting a closing wire through the overlapping coil area. Each connector part has a set of splice fingers engaging in correspondingly shaped finger recesses formed in the belt member.

20 Claims, 2 Drawing Sheets

(56) References Cited

U.S. PATENT DOCUMENTS

2002/0148707 A1* 10/2002 Tarnawskyj et al. ....... 198/844.2
2006/0151303 A1*  7/2006 Motoda ...................... 198/844.2
2008/0110727 A1*  5/2008 Fandella ....................... 198/834
2012/0205223 A1*  8/2012 Moeschen-Siekmann et al. ........................... 198/844.2
2012/0217139 A1*  8/2012 Boucher et al. ............ 198/844.2
2014/0183010 A1*  7/2014 Muehlen ................... 198/844.2

* cited by examiner

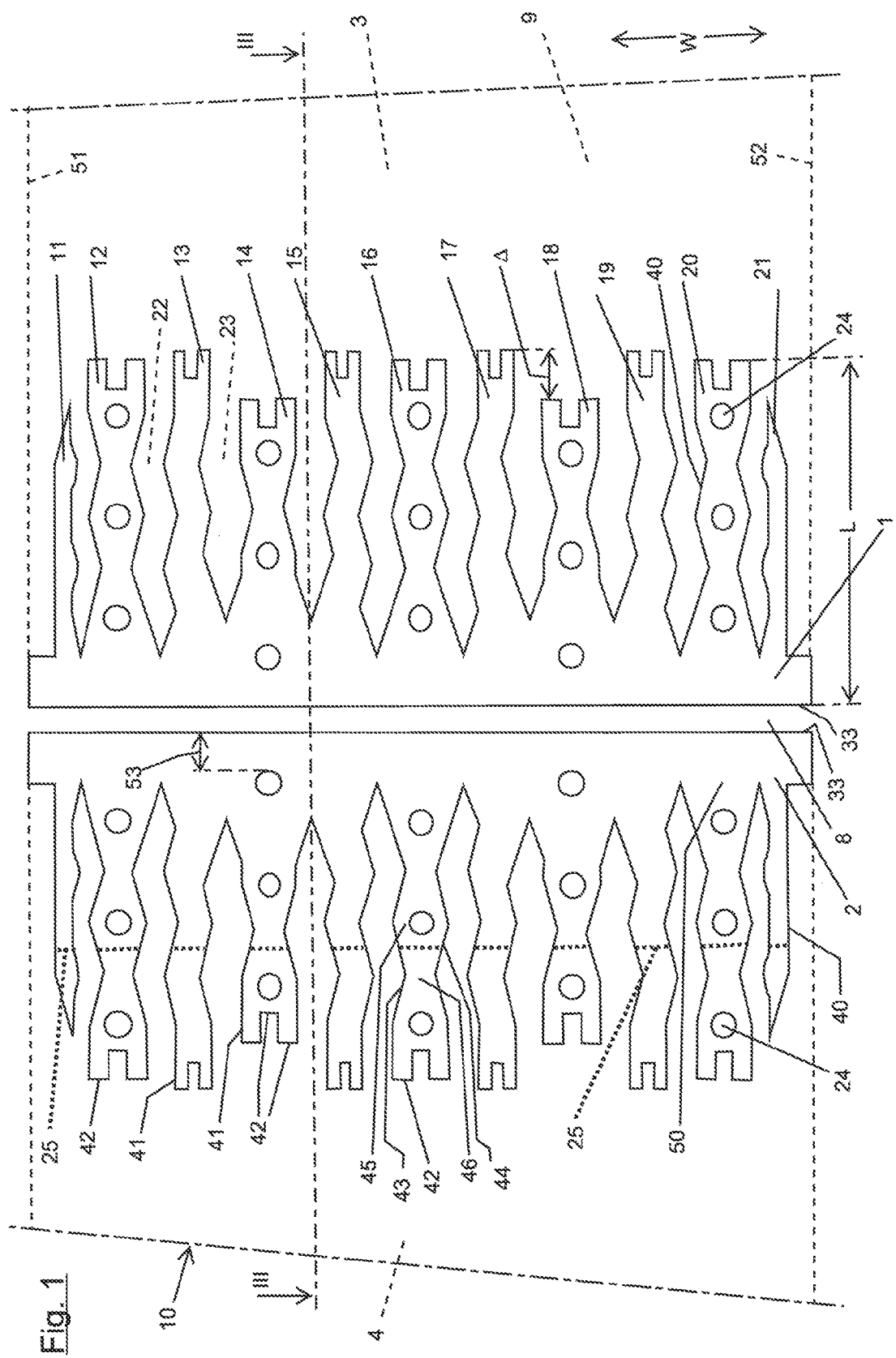

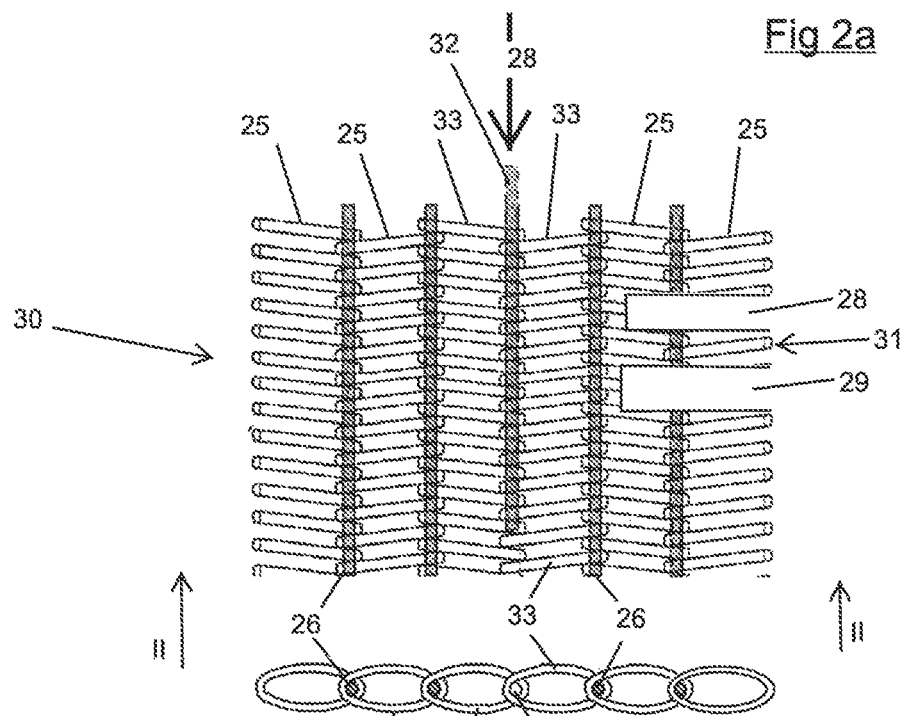
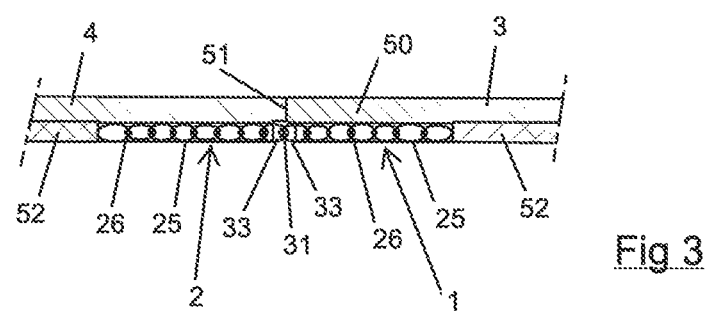

CONVEYOR BELT HAVING OPPOSING ENDS TO BE CONNECTED FOR ENDLESSING THE CONVEYOR BELT

CROSS-REFERENCE TO RELATED APPLICATION

This patent application claims foreign priority to Netherlands Patent Application No. 2011044, filed Jun. 26, 2013, the entire contents of which is hereby incorporated by reference.

SUMMARY

The present invention relates to a conveyor belt having opposing ends to be connected for endlessing the conveyor belt; wherein the belt comprises a belt member, and two planar connector parts provided one at each said end of the belt; wherein each connector part has, at an edge of the connector part, an edge coil extending over the width of the belt; and wherein the belt is configured to be endlessed by bringing the edge coils of the first and second end into a sideways engagement to obtain an overlapping coil area and by inserting a closing wire through the overlapping coil area.

In this application a 'coil' is understood to be a tubular member formed by a wire, like a helical wire. In this respect it is to be noted that the cross section of the tubular member can have many different shapes, like a circular shape, an oval shape, an elliptical shape, a square shape, a rectangular shape, a hexagonal shape or any other circumferential shape. The wire defines this shape. In case of a helical wire, the tubular member will be defined by a continuous wire extending with a certain pitch around a tube having a constant circular, oval, elliptical, square, rectangular, hexagonal etcetera cross section.

Such a conveyor belt is known from DE-1.923.039. This document discloses a conveyor belt having two flat carrier pieces (10) each provided with a coil (W), which coils are connected by a wire (5) inserted through the overlapping, mutually engaging coils. The carrier flaps are attached to the rest of the belt by stitching or adhesive or welding. The connection of the carrier flaps of DE-1.923.039 to the rest of the belt is susceptible to loosening and the thickness of the belt at the location of the flaps is increased and the strength of the belt at the location of the flaps is reduced. An advantage of belts endlessed by means of inserting a wire through the overlap between two coils is that the endlessing can take place at the site of the conveyor device after threading the not yet endlessed belt through the conveyor device around all rollers of the conveyor device. The time and effort to disassemble the conveyor device in order to mount a new conveyor belt is reduced considerably.

The present invention has as an object to provide an improved conveyor belt of the above mentioned type.

This object may be achieved by providing a conveyor belt having opposing ends to be connected for endlessing the conveyor belt; wherein the belt comprises a belt member, and two planar connector parts provided one at each said end of the belt; wherein each connector part has, at an edge of the connector part, an edge coil extending over the width of the belt; wherein the belt is configured to be endlessed by bringing the edge coils of the first and second end into a sideways engagement to obtain an overlapping coil area and by inserting a closing wire through the overlapping coil area; wherein each connector part has a set of splice fingers engaging in correspondingly shaped finger recesses formed in the belt member; wherein the connector parts are attached to the belt member by forming a joint along the interface between the splice fingers and the finger recesses. Here the interface comprises the contour defined by the outer edges of the splice fingers, on the one hand, and the contour defined by the inner edges of the finger recesses, on the other hand.

In the field of conveyor belts, it is known to endless a longitudinal belt member by providing one end of the belt with a first set of splice fingers and the other end of the belt with a second set of splice fingers mating the first set of splice fingers, bringing the first and second set of splice fingers into mutual engagement and bonding the first set of splice fingers to the second set of splice fingers such that a joint is formed between the first and second set of splice fingers. With this splicing technique, it is possible to obtain an endless conveyor belt with an integral joint providing a smooth transition between the endlessed ends of the belt, which transition is strong and reliable. However, this splicing technique requires experienced craftsman for establishing the bonded splice. Further, using this splicing technique on site directly on a conveyor system requires a considerable working space available for the tools. The technique of using so called 'edge coils' is a simple technique for endlessing, which can be done on site by non-trained technicians whilst the belt is already in place in the conveyor system. On site, the conveyor belt is threaded through the conveyor system and endlessed on site by inserting the wire through the overlapping coils. In general the structure, such as the layer structure, of the belt member and connector parts will be different from each other. The belt member will be designed taking into account typical requirements for beltings, whilst the connector parts will be designed from the perspective of carrying a coil in a secure and reliable manner. Experiments showed that the endlessed conveyor belt according to the invention is at the location of the connector parts strong and reliable. Further the thickness of the belt can be kept essentially constant throughout its length.

The joint along said interface can be formed with the use of an adhesive applied at and/or between the inner edge of the finger recesses and the outer edge of the splice fingers. The connectors can be connected to a non-thermoplastic or thermoplastic base belt by means of an adhesive and/or by means of the use of an un-vulcanized rubber and applying heat and pressure. Also other techniques for making an integral joint are conceivable.

According to one embodiment of the invention, the belt member and the connector parts each comprise a thermoplastic material and the joint has been formed as an integral joint by heat bonding these thermoplastic materials along said interface. This heat bonding can be done off site in a conveyor belt production facility or other facility. Subsequently the conveyor belt is transferred to the conveyor system requiring a belt.

The joint between the splice fingers end the belt member can be improved in two manners:
  by providing a plurality of the splice fingers of a said set of splice fingers with forked ends;
  and/or
  by giving the splice fingers different lengths.

These two measures of fork shaped and different finger lengths can, according to the invention, be applied separate from each other, but in combination the strength, reliability and life expectancy of the belt according to inventions is further improved. It is assumed that this noticed improvements have its general basis—as worded in claim 2—in configuring the free ends of the splice fingers to distribute forces, like flexing and/or traction and/or shear forces, experienced in the joints at the extremities of the splice fingers when the belt curves around a roller, over the set of splice fingers by preventing the joints at the extremities of the splice fingers from simultaneously arriving at said roller.

According to a further embodiment of the invention, the splice fingers have two opposing longitudinal sides which are wavy shaped, like a zigzag or square wave. This provides a mechanical anchorage between the longitudinal sides of the splice fingers and the correspondingly shaped longitudinal sides of the finger recesses in the belt member. This improved anchorage prevents gaps being formed at the tips of the fingers or at the roots of the fingers. These gaps might be caused due to differences in contraction of the belt member and carrier part during the heat bonding process or during use of the belt.

According to a further embodiment of the invention, the opposing longitudinal sides of a said splice finger are, viewed with respect to the length direction of the said splice finger, mirrored such that, viewed along the length of the splice finger, the splice finger has a sequence of one or more wide zones and one or more narrow zones. It is noted in this respect that the terms wide and narrow are used here in relation to each other, in other words assuming the width of a finger in the wide zone is x, this means that the width of this finger in the narrow zone is smaller than x.

According to a further embodiment of the invention, the conveyor belt is provided with perforations, such as perforations extending through the splice fingers. Such perforations allow vacuum suction being applied for gripping an article to be conveyed on the conveyor belt. This is for example known for conveying sheet material like paper or cardboard. In case of wavy shaped, mirrored longitudinal sides of the splice fingers, the perforations through the splice fingers can be provided in the wide zones of the splice finger. Further it is envisaged to have a set of splice fingers with perforated and non-perforated fingers, which are preferably arranged alternatingly, wherein the perforated fingers are wider than the non-perforated fingers.

According to a further embodiment of the invention, the connector parts comprise a layer formed by a plurality of parallel coils which on the one hand sideways engage and overlap and on the other hand are sideways connected by a connecting wire inserted through the overlapping area of sideways engaging coils. The connector parts can for example be easily formed by punching out from a sheet of parallel coils connected by wires inserted through the overlapping area of sideways engaging coils. Such a sheet of parallel coils connected by wires—which type of sheet is also called a 'spiral web' or 'spiral fabric'—can for example be found in WO-2004/094275, the drawings of which show a clear example.

According to a further embodiment of the invention, at least one of the connector parts has an adjustment section extending from the edge coil in the direction of the base of the splice fingers; and wherein the adjustment section comprises at least 2, such as 2 to 10 or more, of said parallel coils extending uninterrupted from one longitudinal side of the belt to the opposing other longitudinal side of the belt. Such an adjustment section allows the end user of the conveyor system to cut the belt down to the size needed by simply cutting of one or more of the parallel coils from the adjustment section. Shortening the belt by removing a segment of the adjustment section allows also to compensate for belt elongation (becoming longer) during use, which occurs due to natural behavior of the belt. This means that in stead of replacing a belt, it can be shortened and reused. This also means that the machine builder, building the conveyor system, can use more compact take-up length tensioning devices. As will be clear, the belt according to this embodiment can have an adjustment section in one or both the connector parts.

According to a further aspect, the invention relates to a conveyor belt according to the invention which has been made endless by inserting a closing wire through the overlapping coil area of the edge coils.

BRIEF DESCRIPTION OF THE DRAWINGS

The present invention will be further elucidated with reference to the drawings, in which:

FIG. 1 is a schematic top view onto a set of two connector parts for use in a conveyor belt according to the invention;

FIG. 2a is a schematic top view onto a spiral sheet which can be used as basis for the connector parts of a conveyor belt according to the invention;

FIG. 2b is a schematic side view of the spiral sheet shown in FIG. 2a, the side view being in accordance with the arrows II-II of FIG. 2a; and FIG. 3 is a schematic longitudinal section of a conveyor belt according to the invention, the longitudinal cross section being indicated with arrows III-III in FIG. 1.

DETAILED DESCRIPTION

In the embodiment as described with reference to the drawings, both the connector parts and the belt member comprise a thermoplastic material, so that heat bonding can be used for obtaining the joint between the connector parts and belt member. As described above, it is however to be noted that also other techniques for attaching the connector parts to the belt member might be used. Further it is to be noted that the connector parts and/or the belt member can also not comprise a thermoplastic material or can comprise in addition to a thermoplastic material one or more other materials as well.

FIG. 1 shows in schematic top view two planar connector parts 1 and 2. Each of these connector parts 1 and 2 is provided at an end 3 respectively 4 of an conveyor belt 10. Indicated with dashed lines in FIG. 1. The conveyor belt 10 is not (yet) endless, as the ends 3 and 4 are at the gap indicated with 8 not (yet) connected to form an endless belt. The connection means for connection the ends 3 and 4 at the gap 8 are not shown in FIG. 1, but comprise according to the invention two so called edge coils 33 and a closing wire 32 as shown in more detail in FIGS. 2 and 3 and discussed in relation to FIGS. 2 and 3.

Each connector part comprises a set of splice fingers 11-21. These splice fingers 11-21 are received in finger recesses formed in the ends of the belt member 9. As indicated with 22 and 23 in FIG. 1, the finger recesses are separated by belt member fingers 22 and 23. Each finger recess has a shape and dimensions which are essentially the same as the shape and dimensions of the corresponding splice finger to be received. Both the belt member 9 and the connector parts 1 and 2 comprise thermoplastic material allowing the belt member and connector parts to be joined by heat bonding the thermoplastic material of the connector part 1, 2 to the thermoplastic material of the belt member 9. This results in a joint 40 following the outer contour of the splice fingers 11-21.

In order to improve the life expectancy of the joint 40, the most of the splice fingers, in this case all the splice fingers except the outermost ones 11 and 21, have a forked end 41. These forked ends 41 have a kind of 'lace tower' shape. The forked ends 41 spread flexing and pulling tension over a wider area, which helps preventing the joint 40 from loosening at the extremity edges 42 of a finger.

Another measure to improve the life expectancy of the joint 40, is that the splice fingers 11-21 have different lengths or said in other words do not all have the same length. In this respect the length L of each splice finger is defined as the length measured from the gap 8 (or edge coil 33, which is not shown in FIG. 1) to the free outer end 41 of the respective splice finger. By providing the splice fingers with different lengths, the free ends 41 of the splice fingers will not simultaneously be subjected to flexing and pulling forces when passing around a roller of a conveyor system. This because the free ends 41 do not reach the roller at the same moment in time. Referring to FIG. 1, the difference in length of the splice fingers 18 and 17 is indicated with Δ. As can be seen in FIG. 1, the difference Δ in length between splice fingers 17 and 18 is relatively large, whilst the difference in length between the splice fingers 16 and 178 is relatively small. The length of splice finger 17 is in this example about 103% of the length of splice finger 16.

It is to be noted that the above measures of the 'forked ends' of the splice fingers and of the 'different length' of the splice fingers can be used separate from each other but also in combination with each other as shown in FIG. 1.

Further referring to FIG. 1, it can be seen that the opposing longitudinal sides 43 and 44 of most of the splice fingers 11-21 might have a wavy shape. In the example of FIG. 1 this wavy shape is a kind of zigzag. The wavy shape can however also be formed in another manner, like in the form of a square wave or sine wave. The wavy shape provides improved anchorage and prevents the joint 40 from loosening due to differences in physical characteristics of the connector part and belt member. For example the connector part might have more contraction in length direction of the conveyor belt than the belt member. The so called wavy shape might be applied in addition to the 'forked ends' and/or 'different length' of the splice fingers, but it might also be applied without applying the 'forked ends' and/or 'different length' of the splice fingers. The wavy shape is, in combination with mirrored longitudinal sides 43, 44, also very useful when perforations are needed.

As can further be seen in FIG. 1, the conveyor belt might optionally be provided with perforations 24 through the splice fingers. These perforations are very useful in case suction forces are used to assist in keeping an article in place on the surface of the conveyor belt. The rows of perforations 24 in the splice fingers 12, 14, 16, 18 and 20 might be continued in the belt member 9, but this is not shown in FIG. 1. In order to accommodate a perforation through a splice finger, the splice finger will require a certain minimum width W at the location of the perforation. As a result the perforated splice fingers are shown in FIG. 1 to be a little wider than the not perforated splice fingers 11, 13, 15, 17, 19 and 21. Note however, that the not perforated splice fingers might have the same width as the perforated splice fingers or might have a larger width as well. The wave shape of the splice fingers can be used as well to obtain sufficient space for the perforations. By making the opposing longitudinal sides 43 and 44 mirror symmetric with respect to the longitudinal axis of the splice finger, the splice finger is given a sequence of wide zones and narrow zones, the wider zones being able to accommodate a perforation.

According to the invention the carrier parts 1 and 2 can be made on the basis of a layer or sheet 30 formed by a plurality of parallel coils 25, 33. This is schematically illustrated in FIG. 2. FIG. 2a shows a top view on such a layer 30 and FIG. 2b shows a side view according to the arrows II-II in FIG. 2a. As such these kind of coil layers are known. Two adjacent and mutually parallel coils 25 engage sideways and are interconnected by a connecting wire 26 inserted through the overlap area of the sideways engaging coils. When a connecting wire 26 is removed, the layer is split in two parts. The two disengaged coils are called in this application the so called 'edge coils' 33 as they will define the edge of the separated layers. Later on these edge coils can be connected again by pressing the coils 33 against each other to obtain an overlap area 27 (see FIG. 2b) through which the so called 'closing wire' 32 can be inserted, as is indicated in FIG. 2a by arrow 28.

The connector parts 1 and 2 can easily be made from such a layer by punching out the shape of the fingers. This is schematically indicated in FIG. 2a by the punched out sections 28 and 29 defining a splice finger 31 in between. Doing so the connector parts 1 and 2 as shown in FIG. 1 can be formed from a sheet like shown in FIG. 1.

The spirals can according to the invention be made from a suitable plastic or other material like a metal. Also the wires (which can also be called pins) 26 and 28 can be made from a suitable plastic or other material, like a metal. The spirals 25, 33 can be embedded in or coated with a thermoplastic material suitable for heat bonding with a thermoplastic material present in the belt member. The thermoplastic material present in the connectors might be the same thermoplastic material as present in the belt member, but these thermoplastic materials might also be different provided they are suitable for heat bonding them together.

FIG. 3 shows very schematically a part of a conveyor belt according to the invention in endless configuration. It shows the two ends 3 and 4 of a belt which are joined together by means of a closing wire inserted through the overlap area 27 of mutually engaging edge spirals 33. The belt shown in FIG. 3 is formed by two connected connector parts 1 and 2, a belt member in the form of a synthetic base belt 52 with fabrics and thermoplastic innerlayers, and a thermoplastic cover layer 50. The thermoplastic cover layer 50 is endlessed at 51 by heat welding after endlessing the belt by insertion of the closing wire 31. It is to be noted that the cover layer 50 can be provided after joining the connector parts to the base belt 52, but the cover layer can also be provided on top of the connectors as well as on top of the base belt 52 before connecting the connectors 1 and 2 to the base belt 52. It is also conceivable to start with a laminate of base belt 52 and cover layer 50 and to cut out recesses for the splice fingers 11-21 of the carrier parts 1 and 2 into the base layer whilst leaving the cover layer above these recesses intact. Finally, it is noted that the belt member can also be formed as a belt of one homogeneous layer of thermoplastic material. This single homogeneous layer then serves both as base belt and as cover layer. If desired, such a homogeneous layer might be without any reinforcement wires or fibres.

Returning to FIG. 1, the two opposing longitudinal sides of the belt are indicated with 51 and 52. The base of the splice fingers 11-21 is indicated with 50. Between the edge coil 33 and the base 50 of the splice fingers 11-21 there is a section having a plurality of parallel coils extending continuously—without interruptions like a perforation or finger recess—from one longitudinal side 51 of the belt to the other longitudinal side 52 of the belt. This section is called the 'adjustment section' and is indicated with reference number 53. This adjustment section allows the end user to cut the belt down to the required length. This cutting down is simply done by removing a connecting wire 26 and removing the detached part of the adjustment section, if necessary after cutting through some belt material at the location of the removed connecting wire. When endlessing the belt, the removed connection wire 26 might serve as closing wire 27, but also another wire might be used as closing wire 27.

What is claimed is:

1. A conveyor belt having opposing ends to be connected for endlessing the conveyor belt, the belt comprising
a belt member; and
two planar connector parts provided one at each end of the belt;
wherein each connector part has, at an edge of the connector part, an edge coil extending over the width of the belt;
wherein the belt is configured to be endlessed by bringing the edge coils of the first and second end into a sideways engagement to obtain an overlapping coil area and by inserting a closing wire through the overlapping coil area;
wherein each connector part has a set of splice fingers engaging in correspondingly shaped finger recesses formed in the belt member; and
wherein the connector parts are attached to the belt member by forming a joint along the interface between the splice fingers and the finger recesses.

2. The conveyor belt according to claim 1, wherein the belt member and the connector parts each comprise a thermoplastic material and wherein the joint has been formed by heat bonding these thermoplastic materials along said interface.

3. The conveyor belt according to claim 1, wherein the free ends of the splice fingers are configured to distribute forces experienced in the joints at the extremities of the splice fingers when the belt curves around a roller, over the set of splice fingers by preventing the joints at the extremities of the splice fingers from simultaneously arriving at said roller.

4. The conveyor belt according to claim 2, wherein a plurality of the splice fingers of a said set of splice fingers has forked ends.

5. The conveyor belt according to claim 3, wherein each splice finger has a length defined as, viewed in length direction of the conveyor belt, the distance from the edge coil to the free end of said splice finger; wherein the splice fingers of a said connector part point in a direction away from the edge coil of said connector part; and wherein a said set of splice fingers has splice fingers of different length.

6. The conveyor belt according to claim 5, wherein adjacent splice fingers of a said connector part have different lengths.

7. The conveyor belt according to claim 6, wherein a plurality of the splice fingers of a said set of splice fingers has forked ends.

8. The conveyor belt according to claim 1, wherein the splice fingers have two opposing longitudinal sides which are wavy shaped, like a zigzag or square wave.

9. The conveyor belt according to claim 8, wherein the opposing longitudinal sides of a said splice finger are, viewed with respect to the length direction of the said splice finger, mirrored such that, viewed along the length of the splice finger, the splice finger has a sequence of one or more wide zones and one or more narrow zones.

10. The conveyor belt according to claim 1, wherein the conveyor belt is provided with perforations extending through the splice fingers.

11. The conveyor belt according to claim 10, wherein the splice fingers have two opposing longitudinal sides which are wavy shaped, like a zigzag or square wave, wherein the opposing longitudinal sides of a said splice finger are, viewed with respect to the length direction of the said splice finger, mirrored such that, viewed along the length of the splice finger, the splice finger has a sequence of one or more wide zones and one or more narrow zones, and wherein the perforations through the splice fingers are provided in the wide zones of the splice finger.

12. The conveyor belt according to claim 10, wherein a set of splice fingers has perforated and non-perforated fingers, wherein the perforated fingers are wider than the non-perforated fingers.

13. The conveyor belt according to claim 12, wherein the perforated and non-perforated fingers are arranged alternatingly.

14. The conveyor belt according to claim 1, wherein the connector parts comprise a layer formed by a plurality of parallel coils which on the one hand sideways engage and overlap and on the other hand are sideways connected by a connecting wire inserted through the overlapping area of sideways engaging coils.

15. The conveyor belt according to claim 14, wherein at least one of the connector parts has an adjustment section extending from the edge coil in the direction of the base of the splice fingers; and wherein the adjustment section comprises at least two parallel coils extending uninterrupted from one longitudinal side of the belt to the opposing other longitudinal side of the belt.

16. The conveyor belt according to claim 15, wherein the adjustment section comprises between two and ten parallel coils extending uninterrupted from one longitudinal side of the belt to the opposing other longitudinal side of the belt.

17. The conveyor belt according to claim 15, wherein the adjustment section comprises more than ten parallel coils extending uninterrupted from one longitudinal side of the belt to the opposing other longitudinal side of the belt.

18. The conveyor belt according to claim 1, wherein the belt member on the one hand and the connector parts on the other hand have a different structure, such as a different structure of layers.

19. The conveyor belt according to claim 1, wherein the belt member and/or the connector parts comprise a non-thermoplastic material.

20. An endless conveyor belt comprising:
a conveyor belt having opposing ends to be connected for endlessing the conveyor belt, the belt including
a belt member, and
two planar connector parts provided one at each end of the belt,
wherein each connector part has, at an edge of the connector part, an edge coil extending over the width of the belt,
wherein the belt is configured to be endlessed by bringing the edge coils of the first and second end into a sideways engagement to obtain an overlapping coil area and by inserting a closing wire through the overlapping coil area,
wherein each connector part has a set of splice fingers engaging in correspondingly shaped finger recesses formed in the belt member, and
wherein the connector parts are attached to the belt member by forming a joint along the interface between the splice fingers and the finger recesses; and
a closing wire inserted through the overlapping coil area of the edge coils.

* * * * *